(12) United States Patent
Kim

(10) Patent No.: US 7,476,003 B2
(45) Date of Patent: Jan. 13, 2009

(54) SURFACE LIGHT SOURCE DEVICE AND BACKLIGHT UNIT HAVING THE SAME

(75) Inventor: Bum Jin Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 55 days.

(21) Appl. No.: 11/802,303

(22) Filed: May 22, 2007

(65) Prior Publication Data

US 2008/0025019 A1    Jan. 31, 2008

(30) Foreign Application Priority Data

Jul. 25, 2006    (KR)    ...................... 10-2006-0069747

(51) Int. Cl.
*F21V 9/00*    (2006.01)

(52) U.S. Cl. .................. 362/231; 362/97; 362/252; 362/612; 362/219; 362/29; 362/220; 362/225; 362/236

(58) Field of Classification Search ...................... None
See application file for complete search history.

(56) References Cited

U.S. PATENT DOCUMENTS 4,492,863 A * 1/1985 Smith, Jr. .................... 250/256
6,856,087 B2 * 2/2005 Lin et al. .................... 313/500
6,923,548 B2 * 8/2005 Lim ............................ 362/612
2007/0074098 A1 * 3/2007 Tam ........................ 715/501.1

* cited by examiner

*Primary Examiner*—Ismael Negron
*Assistant Examiner*—Danielle Dunn
(74) *Attorney, Agent, or Firm*—McDermott Will & Emery LLP

(57) ABSTRACT

A surface light source device having LED clusters arranged in a matrix of rows and columns on a board. Each of the LED clusters includes red, green and blue LEDs arranged in a triangle. The LED clusters are grouped into A, E, C and D, which have the red LEDs located top, right, bottom and left, respectively, from a center of the triangle. The matrix of the LED clusters includes alternating first and second type rows arranged repeatedly from top to bottom of the matrix, terminating with the second type row. The first type rows each have first type cluster arrays of the LED clusters arranged in a repeating order of E, C, D and C from left to right. The second type rows each have second type cluster arrays of the LED clusters arranged in a repeating order of A, D, A and D from left to right.

14 Claims, 12 Drawing Sheets

SURFACE LIGHT SOURCE DEVICE AND BACKLIGHT UNIT HAVING THE SAME

CLAIM OF PRIORITY

This application claims the benefit of Korean Patent Application No. 2006-69747 filed on Jul. 25, 2006 in the Korean Intellectual Property Office, the disclosure of which is incorporated herein by reference.

BACKGROUND OF THE INVENTION

1. Field of the Invention

The present invention relates to a surface light source device, and more particularly, to a high quality, high-uniformity surface light source device using a light emitting diode (LED) and a direct-type backlight unit having the surface light source device.

2. Description of the Related Art

Recently, with a thinner and higher-performing trend of a display device, a liquid crystal display has been broadly utilized in TVs or monitors. A liquid crystal panel does not emit light on its own, thereby requiring a separate light source unit, i.e., a backlight unit (BLU). The BLU has adopted as its light source a cold cathode fluorescent lamp (CCFL), which, however, is giving way to a light emitting diode (LED) lately thanks to its advantage in terms of color representation and power consumption.

In general, the BLU includes an edge-type BLU and a direct-type BLU. In the former, a bar-shaped light source is disposed at an edge of a liquid crystal panel to irradiate light onto a light guide plate. In contrast, in the latter, a surface light source is disposed below the liquid crystal panel to directly irradiate light onto the light guide panel. The direct-type BLU includes a surface light source disposed in a lower part thereof and an optical member such as a diffusing plate disposed at a predetermined distance above the surface light source.

A plurality of red, green and blue LEDs are arranged uniformly at a predetermined interval on a circuit board to realize a white surface light source for a direct-type BLU. In this direct-type BLU, light outputted from the LEDs may slightly differ in uniformity depending on arrangement thereof but typically, color stains are caused at side portions or a central portion of an LCD screen, or a top surface of the BLU. To reduce color non-uniformity including color stains, a greater number of LEDs may be more densely arranged, which however entails higher costs without considerably lessening color non-uniformity at the side portions of the screen.

FIG. 1a is a plan view illustrating an example of a conventional surface light source for a direct-type backlight unit, and FIG. 1b is a schematic view illustrating a light output pattern on the top surface of a backlight unit including the surface light source shown in FIG. 1a. Referring to FIG. 1a, the surface light source device 10 includes a plurality of red R, green G and blue B LEDs arranged on a circuit board 11. Light from these red R, green G and blue B LEDs is combined together to produce white light. A reflective plate 17 is disposed at edges of the board 11 to upwardly reflect light which is propagating laterally from the board 11.

The red R, green G and blue B LEDs are arranged into a cluster 15 with a triangular configuration, and a plurality of the LED cluster 15 are arranged in a matrix. Herein, a light emitting diode (LED) cluster means a unit LED group in which at least two LEDs are clustered to generate white light. As shown in FIG. 1a, all the LED clusters 15 are identically arranged in such a way that the highly visible red LED R in each of the clusters 15 is located top from a center of the triangular configuration (refer to an arrow in the left side of FIG. 1a).

However, in the aforesaid LED arrangement, color stains appear at side portions of the board, specifically, upper side portion S1 and lower side portion S3 of the board due to non-uniform color combination and light reflection in the vicinity of the reflective plate 17. This causes output light to be distributed with less uniformity on an entire top surface 50 of the BLU. That is, as shown in FIG. 1b, a red color stain appears on an area P1 of the top surface of the BLU, i.e., the upper side portion S1 of the board. Meanwhile, a blue or green color stain occurs in another area P2 of the top surface of the BLU, i.e., the lower side portion S3 of the board. Especially, the red light is highly visible so that the red color stain is mainly responsible for degrading color uniformity considerably.

FIG. 2a is a plan view illustrating another example of a conventional surface light source 20 for a backlight unit. FIG. 2b is a schematic view illustrating a light output pattern on a top surface of the backlight unit including the surface light source device of FIG. 2a. Referring to FIG. 2a, LED clusters are grouped into two types of clusters 25 and 26. In the clusters 25, red LEDs are located right from a center of a triangular configuration. In the clusters 26, red LEDs are located left from a center of the triangular configuration (refer to an arrow in FIG. 2a). These two types of LED clusters 25 and 26 are arranged alternately and repeatedly from top to bottom. For example, odd rows have only the first type LED clusters 25 arranged repeatedly and even rows have only the second type LED clusters 26 arranged repeatedly.

The surface light source device of FIG. 2a moderately alleviates color stains caused on the upper side portion S1 and the lower side portion S3 of the board. However, such color stains still appear considerably at corners of the board, notably, an upper right corner and a lower left corner. That is, as shown in FIG. 2b, the corners P3 and P4 of the top surface of the BLU experience a red or yellow color stain. Various alternatives to the arrangement of the LEDs as shown in FIGS. 1a and 2a have been suggested, however, without fundamentally overcoming a problem of color non-uniformity such as color stains.

SUMMARY OF THE INVENTION

The present invention has been made to solve the foregoing problems of the prior art and therefore an aspect of the present invention is to provide a high-quality surface light source device capable of suppressing color stains at side portions of the board and producing more uniform white light.

Another aspect of the invention is to provide a backlight unit equipped with a light source device capable of suppressing color stains and producing more uniform white light.

According to an aspect of the invention, the surface light source device includes a board; and a plurality of light emitting diode clusters arranged in a matrix of rows and columns on the board, each of the light emitting diode clusters including a red light emitting diode, a green light emitting diode and a blue light emitting diode arranged in a triangular configuration, wherein the light emitting diode clusters are grouped into A, E, C and D clusters according to locations of the red light emitting diodes, the A, E, C and D clusters having the red light emitting diodes located top, right, bottom and left, respectively, from a center of the triangular configuration, wherein the matrix of the light emitting diode clusters includes alternating first and second type rows arranged repeatedly from top to bottom of the matrix, terminating with a second type row, wherein each of the first type rows has first type cluster arrays of the light emitting diode clusters arranged in a repeating order of E, C, D and C from left to right, terminating with D and C sequentially, and wherein each of the second type rows has second type cluster arrays of the light emitting diode clusters arranged in a repeating order of A, D, A and D from left to right, terminating with A and D sequentially.

According to a preferred embodiment of the invention, in the matrix of the first and second type cluster arrays, odd rows have only the first type cluster arrays arranged in a repeating order, and even rows have only the second type cluster arrays arranged in a repeating order.

According to an embodiment of the invention, the matrix of the light emitting diode clusters includes a plurality of third type cluster arrays arranged across the board, each of the third type cluster arrays comprising a 2×4 matrix which has an upper row of the first type cluster arrays and a lower row of the second type cluster arrays.

According to another embodiment of the invention, in the matrix of the first and second type cluster arrays, odd rows have the first type cluster arrays arranged in a repeating order, terminating with D and C sequentially, and even rows have the second type cluster arrays arranged in a repeating order, terminating with A and D sequentially.

According to further another embodiment of the invention, each of the light emitting diode clusters comprises a package including a package body mounted on the board and red, green and blue light emitting diode chips mounted on the package body.

According to further another embodiment of the invention, each of the red, green and blue light emitting diodes comprises a package including a package body mounted on the board and a light emitting diode chip mounted on the package body.

According to further another embodiment of the invention, each of the red, green and blue light emitting diodes comprises a light emitting diode chip directly mounted on the board and a resin encapsulant surrounding the light emitting diode chip.

According to another aspect of the invention, the surface light source device includes a board; a plurality of light emitting diode clusters arranged as described above; and a diffusing plate disposed over the light emitting diode clusters at a predetermined interval from the board.

In this specification, 'E-C-D-C' indicates cluster arrays arranged in a repeating order of E, C, D, and C from left to right. 'A-D-A-D' indicates cluster arrays arranged in a repeating order of A, D, A, and D from left to right. Also, 'D-C' indicates cluster arrays arranged in a repeating order of D and C from left to right. 'A-D' indicates cluster arrays arranged in a repeating order of A and D from left to right.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a plan view illustrating an example of a conventional surface light source device of a backlight unit;

FIG. 1b is a schematic view illustrating a light output pattern on a top surface of the backlight unit employing the surface light source device of FIG. 1a;

FIG. 2b is a schematic view illustrating output light on a top surface of the backlight unit employing the surface light source device of FIG. 2a;

DETAILED DESCRIPTION OF THE PREFERRED EMBODIMENT

Figure 1A:
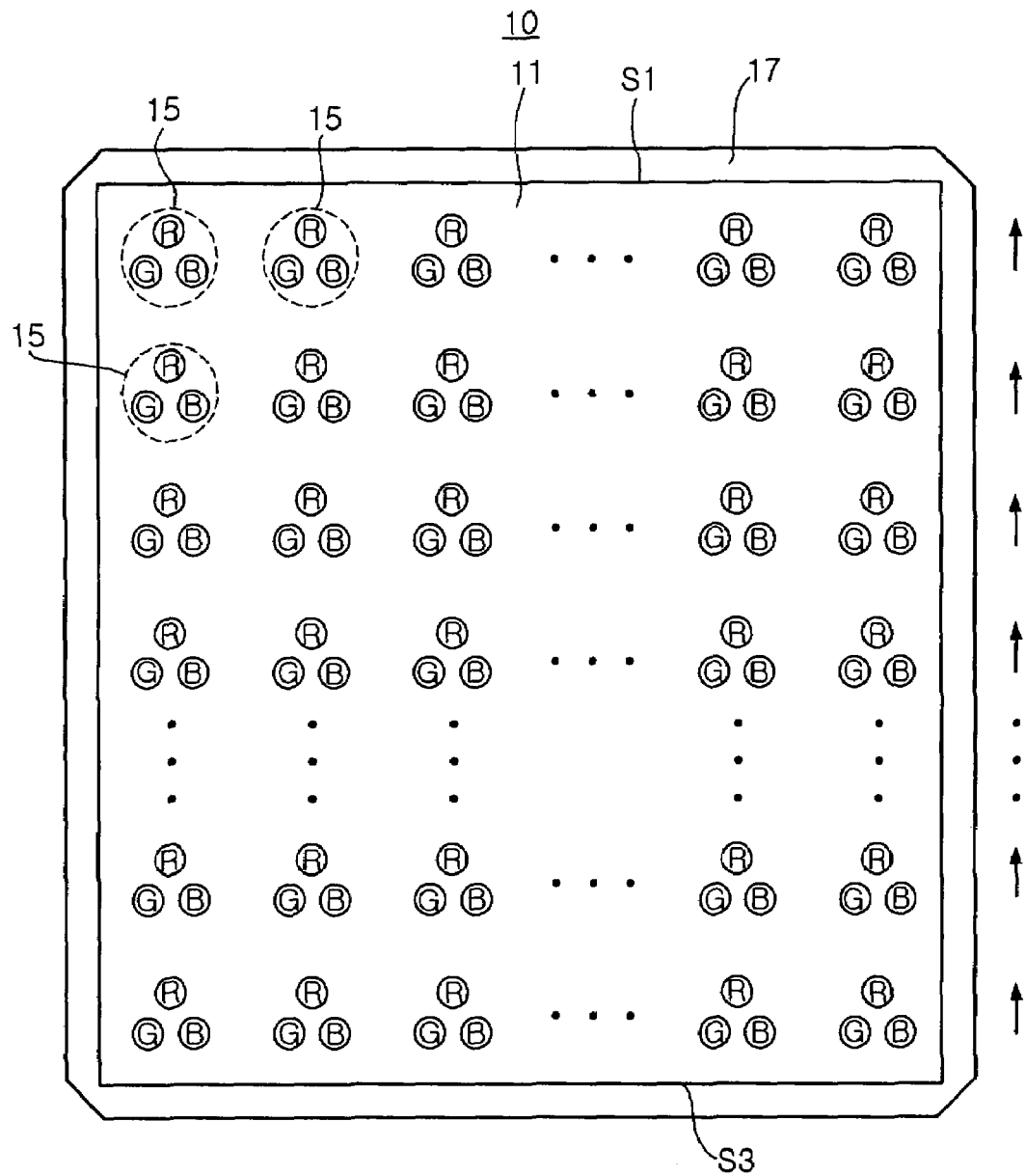
Figure 1B:
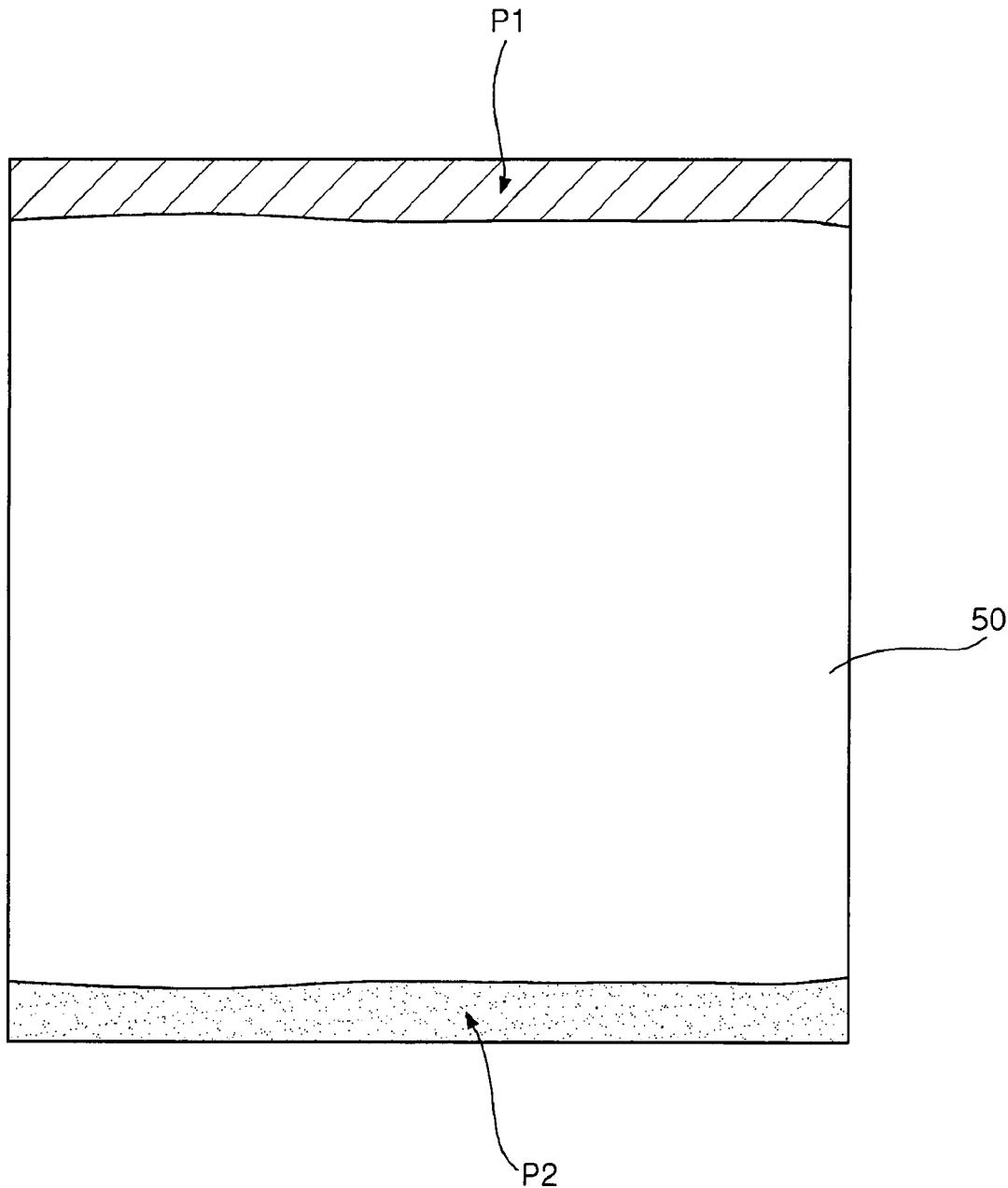

Exemplary embodiments of the present invention will now be described in detail with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference signs are used to designate the same or similar components throughout.

Figure 3:
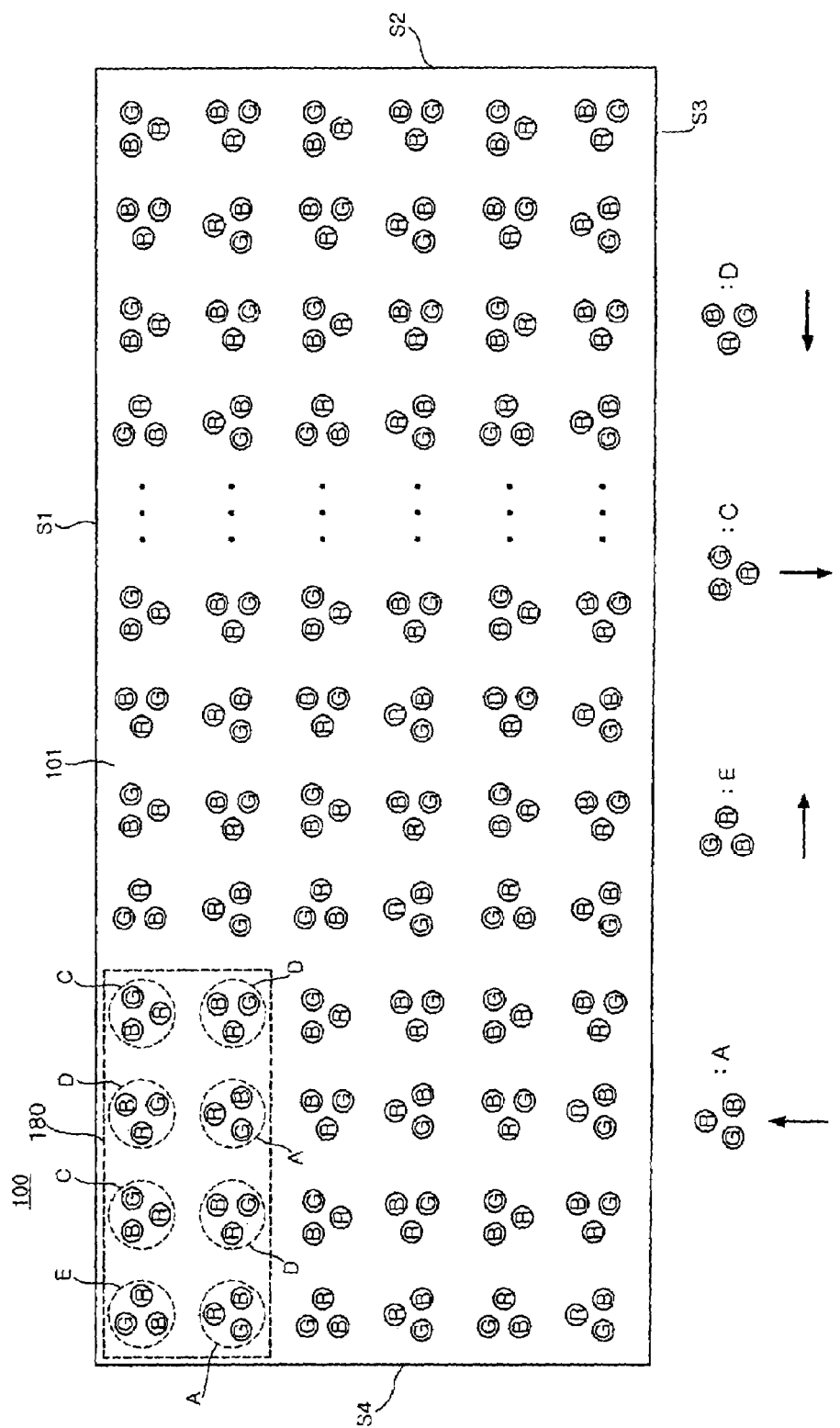
FIG. 3 is a plan view illustrating a surface light source device according to an embodiment of the invention.
Figure 4:
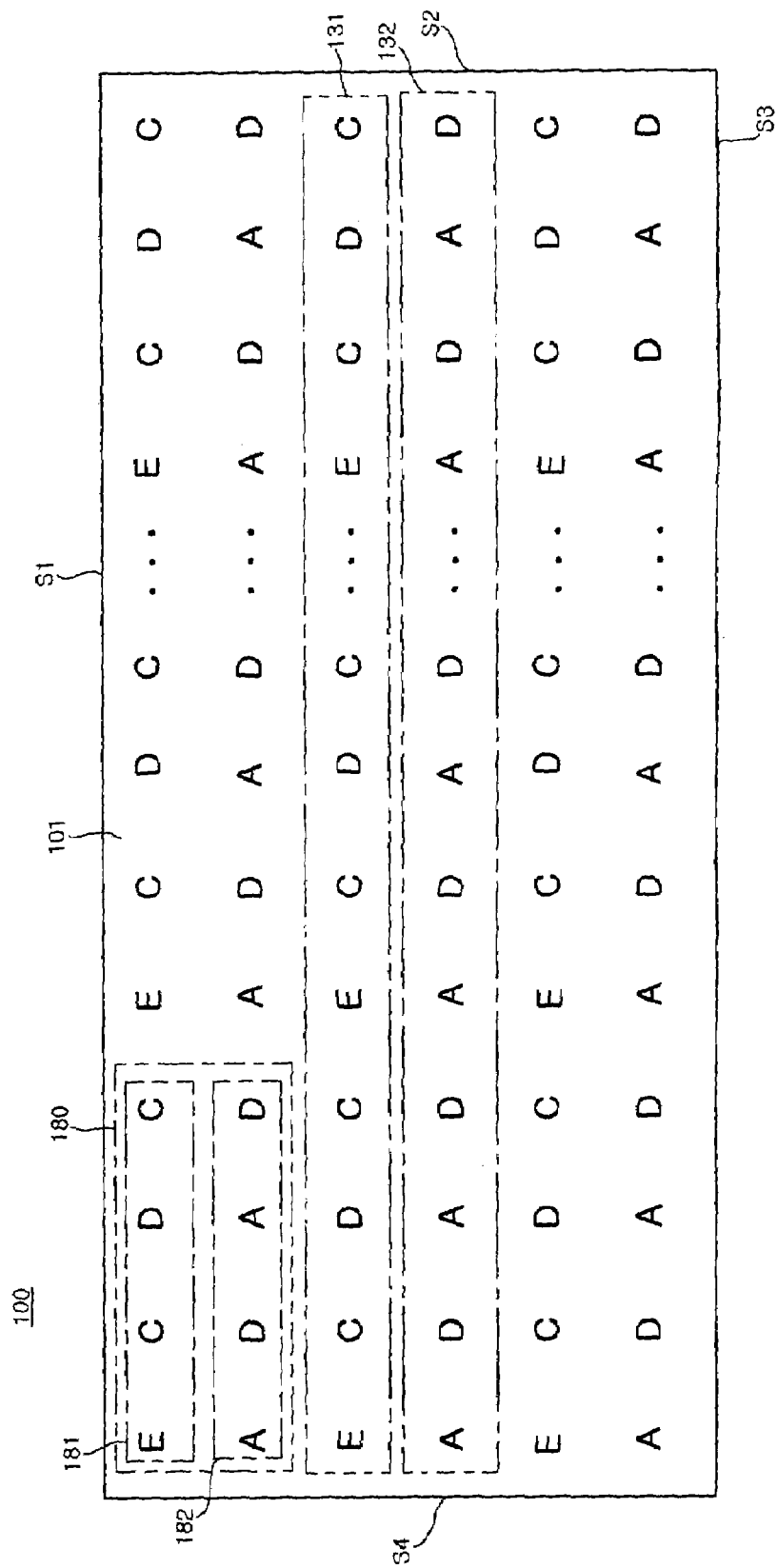
FIG. 4 is a plan view for explaining arrangement of LED clusters in the surface light source device of FIG. 3.

FIG. 3 is a plan view illustrating a surface light source device according to an embodiment of the invention, and FIG. 4 is a schematic plan view for better understanding of FIG. 3. Referring to FIG. 3, the surface light source device 100 includes a rectangular-shaped board 101 and a plurality of red R, green G and blue B LEDs mounted thereon. A wiring pattern is formed on the board 101 and a reflective plate (not illustrated) may be disposed at edges of the board to reflect light propagating laterally from the board 101.

As shown in FIG. 3, the individual red R, green G and blue B LEDs are disposed in close proximity to form individual LED clusters in a triangular configuration. The LED clusters are arranged in a matrix of rows and columns, on the board 101. Here, the number of the rows is at least two and the number of the columns is at least four.

The LED clusters are grouped into A, E, C and D clusters according to locations of the LEDs. The cluster A has the red LED R located top S1 from a center of the triangular configuration (refer to an arrow in a lower part of FIG. 3). The cluster E has the red LED R located right S2 from the center of the triangular configuration. The cluster C has the red LED R located bottom S3 from the center of the triangular configuration. The cluster D has the red LED R located left S4 from the center of the triangular configuration. Grouping of the A, E, C and D clusters is based on the location of the red LED within each of the triangular configurations. Therefore, the green G LED and the blue B LED may be arranged reversely from each other.

To achieve high color uniformity and an optimized white surface light source, the A, E, C and D clusters just described are arranged uniquely (refer to FIG. 4). That is, as apparent from FIG. 4, a matrix of LED clusters includes alternating first and second type rows arranged repeatedly from top to bottom of the matrix, terminating with a second type row. Each of the first type rows has first type cluster arrays E-C-D-C: 181 of the LED clusters arranged in a repeating order of E, C, D and C from left to right, terminating with D and C sequentially. Also, each of the second type rows has second type cluster arrays A-D-A-D: 182 of the LED clusters arranged in a repeating order of A, D, A and D from left to right, terminating with A and D sequentially.

In the matrix of the first and second type cluster arrays of FIG. 4, odd rows, e.g., 131 have only the first type cluster arrays 181 arranged in a repeating order. Also, even rows, e.g., 132 have only the second type cluster arrays 182 arranged in a repeating order.

Moreover, according to this embodiment of the invention, the matrix of the light emitting diode clusters includes a plurality of third type cluster arrays 180 arranged repeatedly across the board. Each of the third type cluster arrays 180 is configured as a 2×4 matrix which has an upper row of the first type cluster arrays 181 and a lower row of the second type cluster arrays 182.

The surface light source device 100 with the LEDs arranged as described above, produces uniform white light on the entire area of the board. That is, light from red R, green G and blue B LEDs are combined optimally together at a central portion and side portions of the board, thereby forming uniform white light across the board. Notably, specific chromatic light is not shown stronger at the side portions including corners of the board, thus overcoming a conventional problem of color stains. The surface light source 100 of the invention outputs uniform white light without color stains so that the number of the LEDs required can be diminished. This as a result saves manufacturing costs for the surface light source device.

Figure 2A:
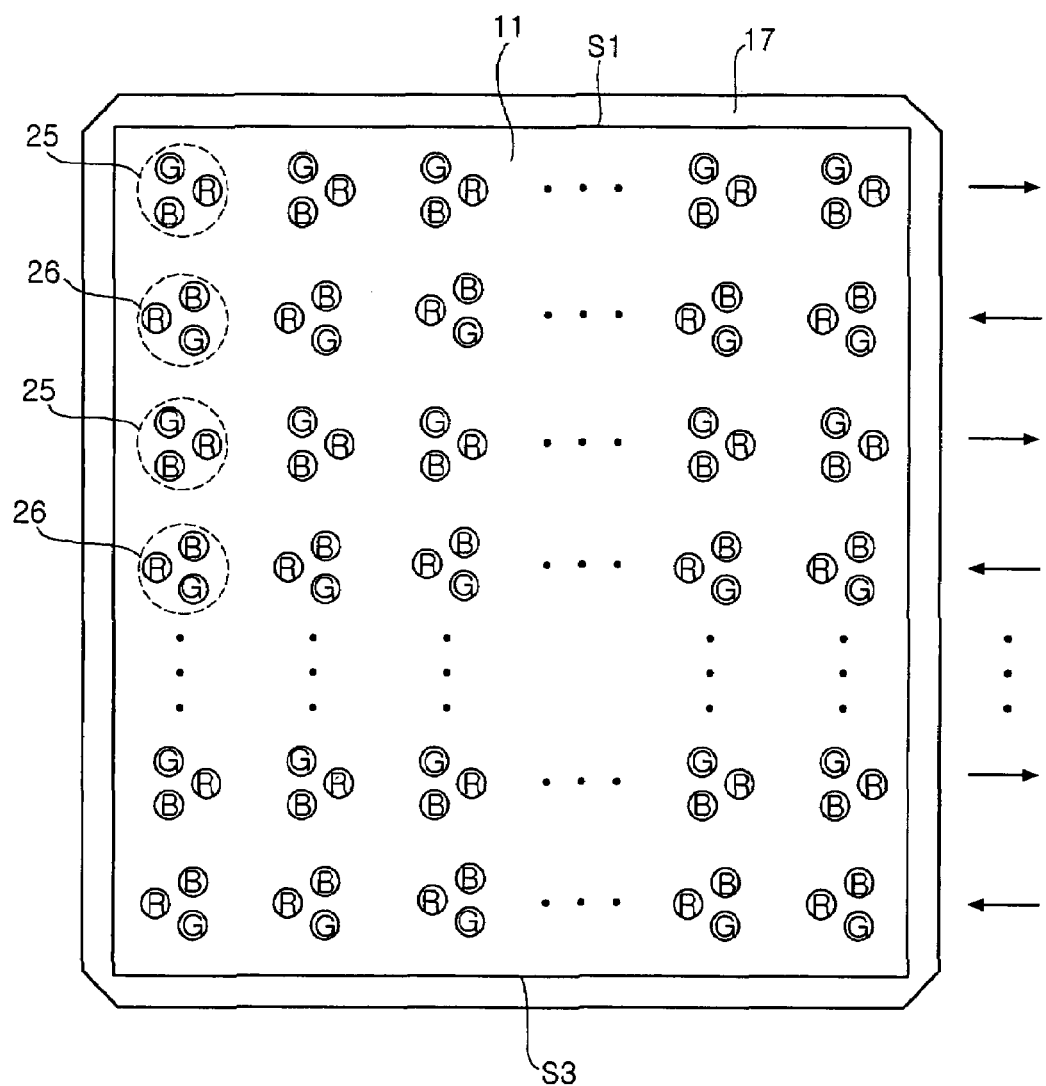
FIG. 2a is a plan view illustrating another example of a conventional surface light source device of a backlight unit.
Figure 2B:
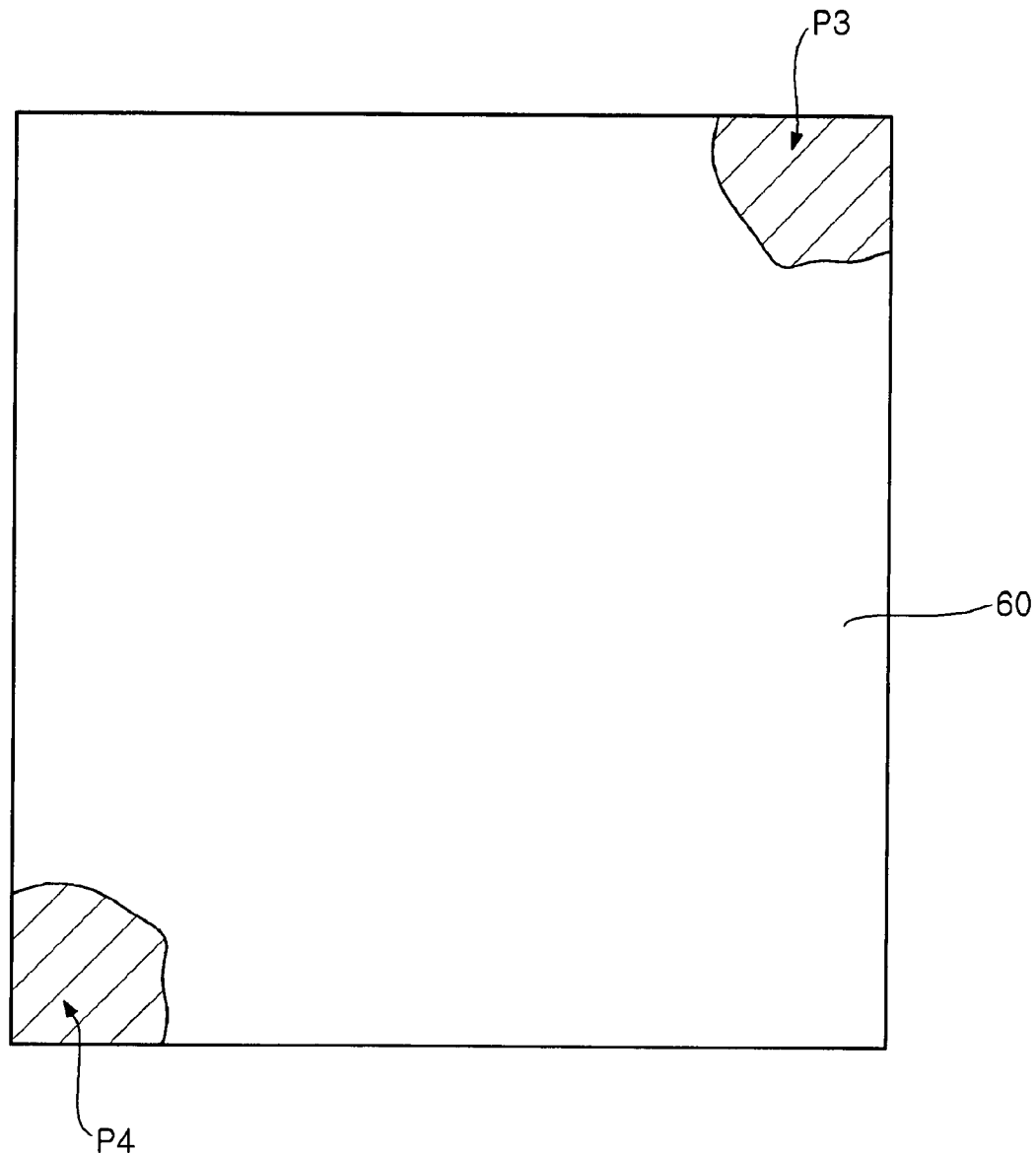

As shown in FIGS. 3 and 4, at an upper left corner is arranged the cluster E where the red R LED is located right S2 from a center of the triangular configuration. At an upper right corner is arranged the cluster C where the red LED R is located bottom S3 from the center of the triangular configuration. At a lower left corner is arranged the cluster A where the red LED R is located top S1 from the center of the triangular configuration. Also, at a lower right corner is arranged the cluster D where the red LED R is located left S4 from the center of the triangular configuration. Accordingly, the red LEDs at the corners of the board are not directed toward side portions of the board adjacent thereto (compare with the prior art of FIG. 2a). This prevents a red or yellow color stain from being formed at each corner of the board, which otherwise may occur due to a reflective plate (not illustrated).

The red R LEDs of each of the clusters disposed at each of side portions S1, S2, S3 and S4 of the board are not directed toward the side portions of the board adjacent thereto (compare with the prior art of FIG. 1a). Therefore, the side portions S1, S2, S3, and S4 of the board are free from a red color stain that may be caused by the reflective plate (not illustrated). Moreover, the red R, green G and blue B LEDs are relatively uniformly arranged on each side portion S1, S2, S3, S4 of the board, thereby not causing green and blue color stains. On the other hand, in the prior art of FIG. 1a, the green G and blue B LEDs are arranged in a row adjacent to the lower side portion S3 of the board. Therefore green and blue color stains are clearly manifest on the lower side portion S3 of the board.

In areas other than the side portions of the board, the red R, green G and blue B LEDs are arranged optimally and uniformly, thereby exhibiting high color uniformity which is substantially free from color difference. Each of the LED clusters has the LEDs of three primary colors arranged in a triangular configuration, thereby producing uniform white light with no color stains. Furthermore, in the case of adjacent two LED clusters, different color LEDs confront each other, thereby forming color-stain-free uniform white light even in an area among the LED clusters.

Figure 5:
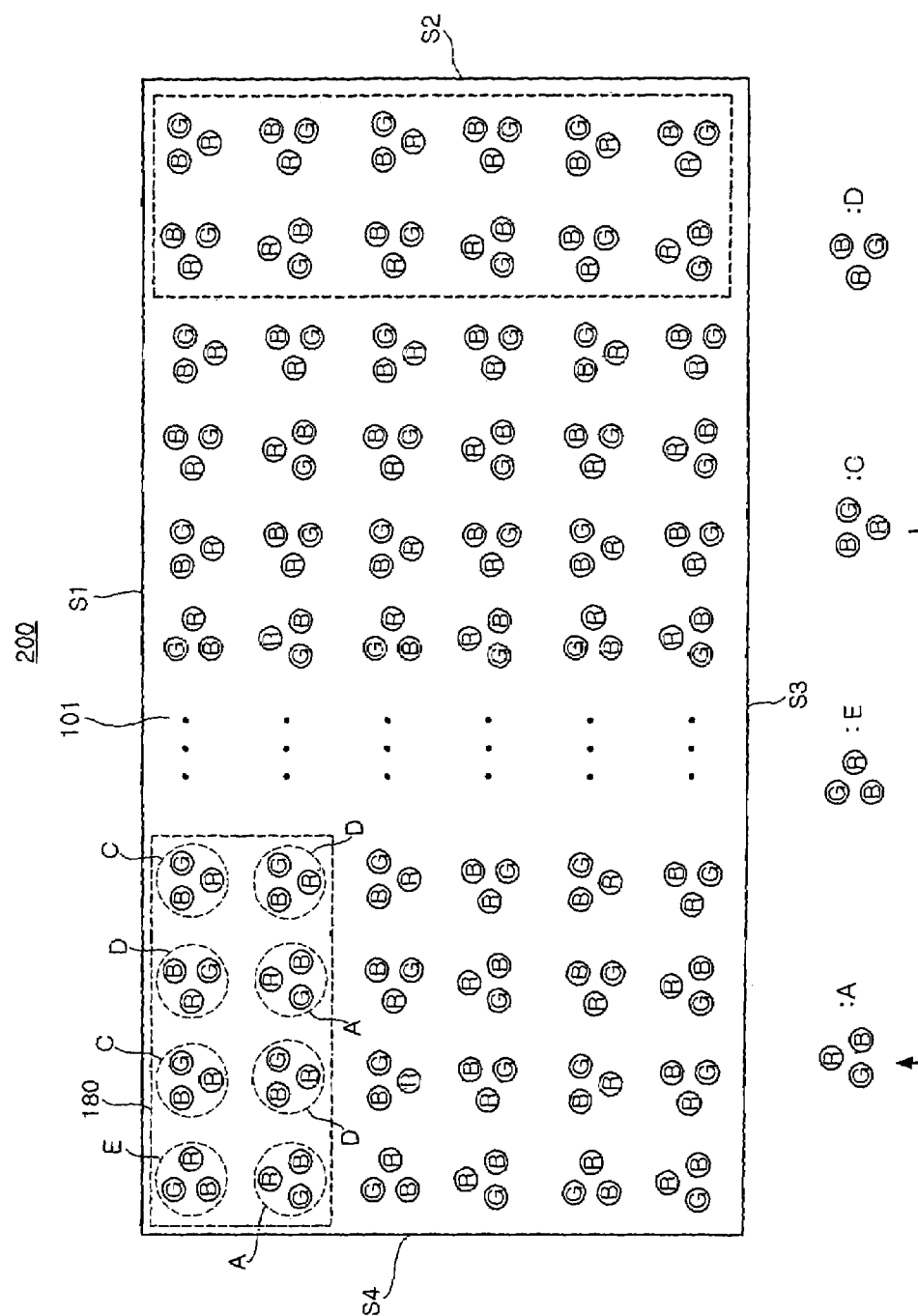
FIG. 5 is a plan view illustrating a surface light source device according to another embodiment of the invention.
Figure 6:
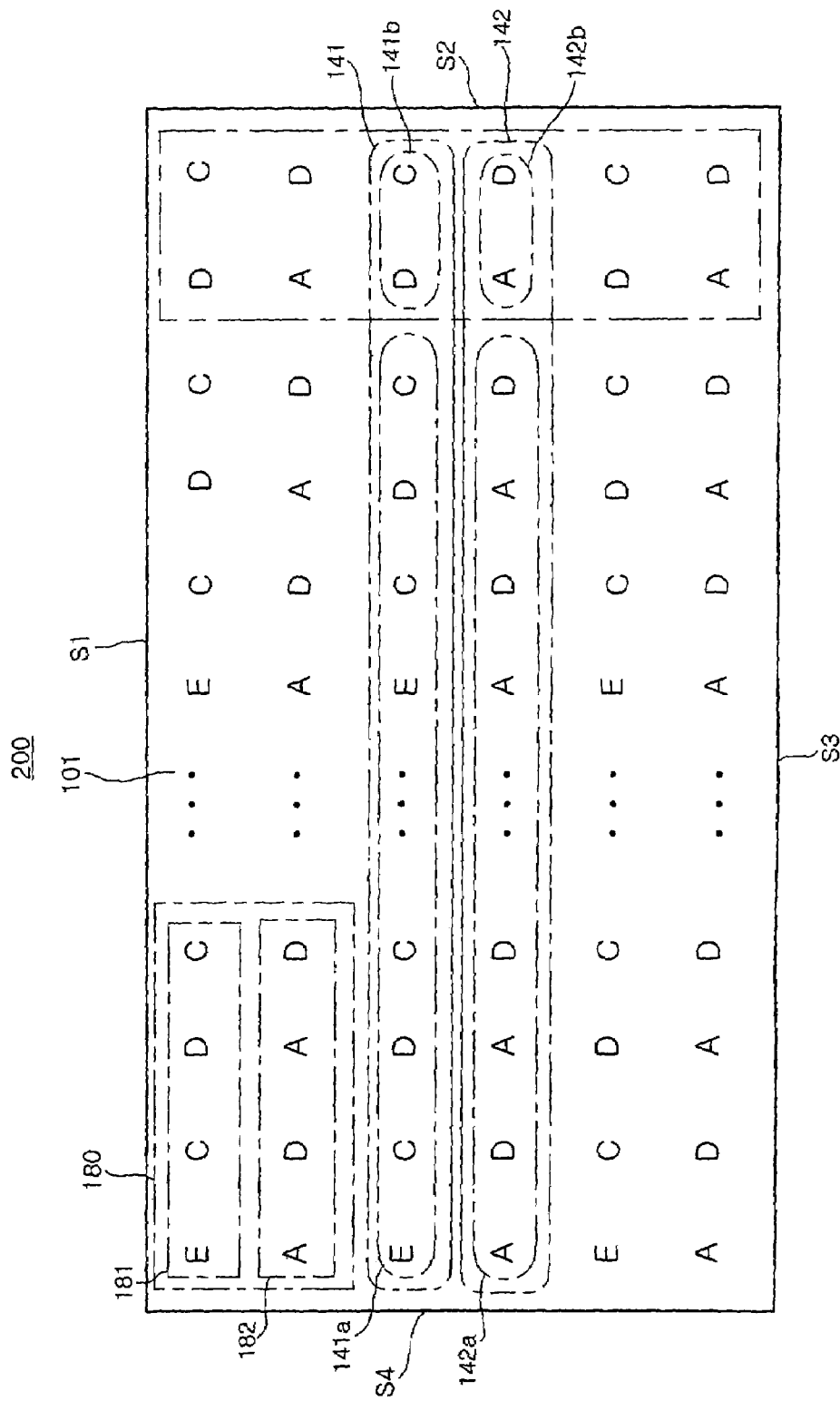
FIG. 6 is a plan view for explaining arrangement of LED clusters in the surface light source device of FIG. 5.

FIG. 5 is a plan view illustrating a surface light source 200 according to another embodiment of the invention and FIG. 6 is a plan view for explaining arrangement of LED clusters of the surface light source device shown in FIG. 5.

Referring to FIGS. 5 and 6, in a matrix of first and second type cluster arrays according to this embodiment, odd rows, e.g., 141 have the first type cluster arrays of the LEDs arranged in a repeating order of E, C, D and C from left to right. However, unlike the aforesaid embodiment, the odd rows terminate with D and C sequentially. That is, the odd rows have the first type cluster arrays of E-C-D-C 141a arranged in a repeating order, terminating with D and C 141b sequentially.

Even rows, e.g., 142 have the second type cluster arrays of the LEDs arranged in a repeating order of A, D, A and D from left to right. Also, unlike the aforesaid embodiment, the even rows terminate with A and D sequentially. That is, the even rows 142 have the second type cluster arrays of A-D-A-D 142a arranged in a repeating order, terminating with A and D 142b sequentially.

As clearly seen from FIG. 6, except for two columns from right of the matrix, the matrix of the light emitting diode clusters includes a plurality of third type cluster arrays 180 arranged repeatedly across the board. Each of the third type cluster arrays is configured as a 2×4 matrix which has an upper row of the first type cluster arrays and a lower row of the second type cluster arrays. Also, the two columns from right of the matrix include alternating arrays of D-C and A-D arranged repeatedly from top to bottom of the matrix. That is, the matrix of the LED clusters includes a first area where the third type cluster arrays are arranged repeatedly and a second area where the alternating arrays of D-C and A-D are arranged repeatedly from top to bottom of the matrix.

In the embodiment of FIGS. 5 and 6, the surface light source device of the invention produces very uniform white light across the board, without color stains at side portions or corners of the board. At an upper and left corner of the board is arranged the cluster E. At an upper right corner of the board is arranged the cluster C. At a lower left corner of the board is arranged the cluster A. Also, at a lower right corner of the board is arranged the cluster D. Moreover, none of the red R LEDs of the individual clusters arranged at the individual side portions S1, S2, S3, and S4 of the board 101 are directed toward the adjacent side portions. Further, the red R, green G and blue B LEDs are relatively uniformly arranged at each side portion S1, S2, S3, and S4. This triangular configuration of the LEDs of three primary colors R, G, B ensures white light to be produced uniformly without color stains in each of the clusters. Furthermore, in the case of adjacent two LED clusters, different color LEDs confront each other, thereby obtaining uniform white light even in an area between the LED clusters.

Figure 7:
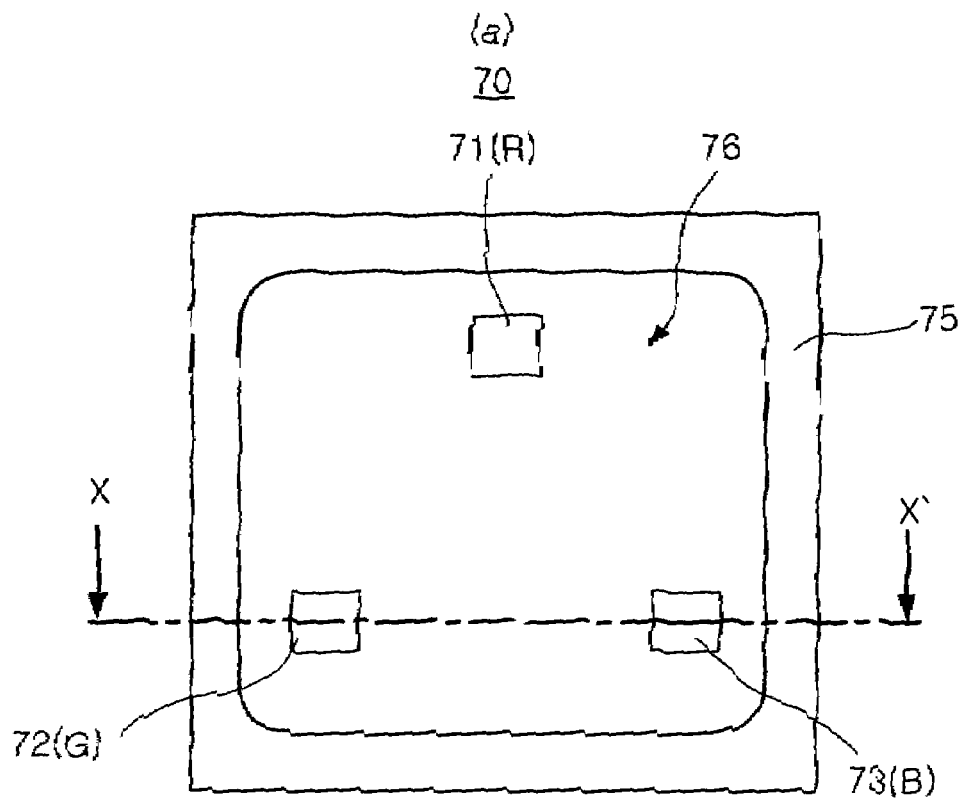
FIGS. 7 (a) and (b) are a plan view and a cross-sectional view illustrating an example of LED clusters applicable to the invention.
Figure 7:
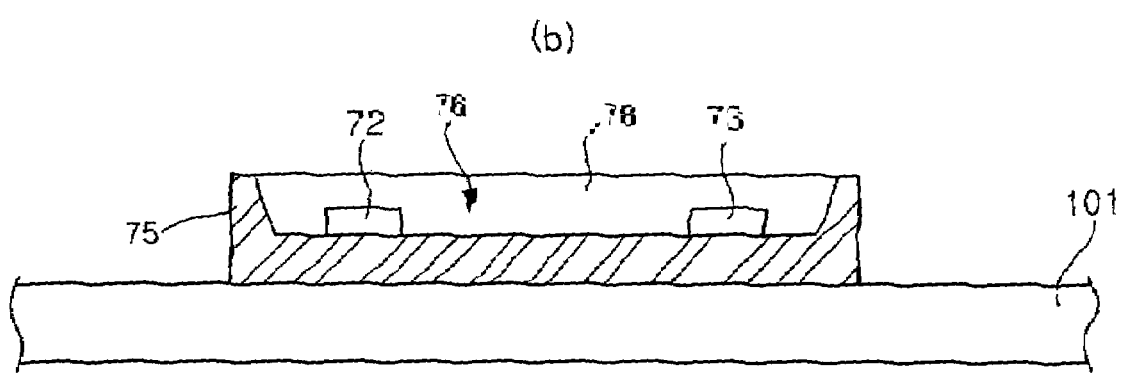
Figure 8:
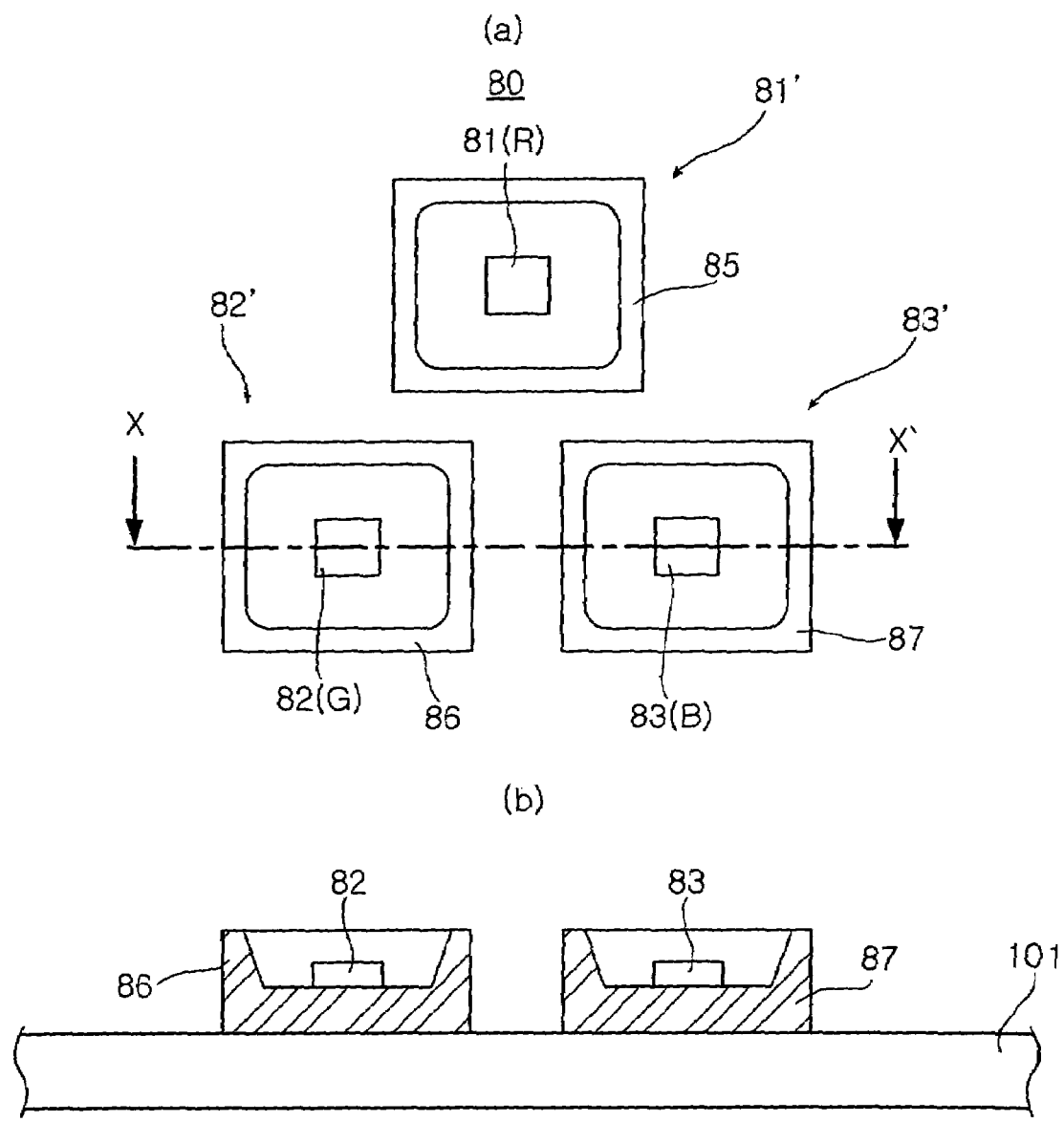
FIGS. 8 (a) and (b) are a plan view and a cross-sectional view illustrating another example of LED clusters applicable to the invention.
Figure 9:
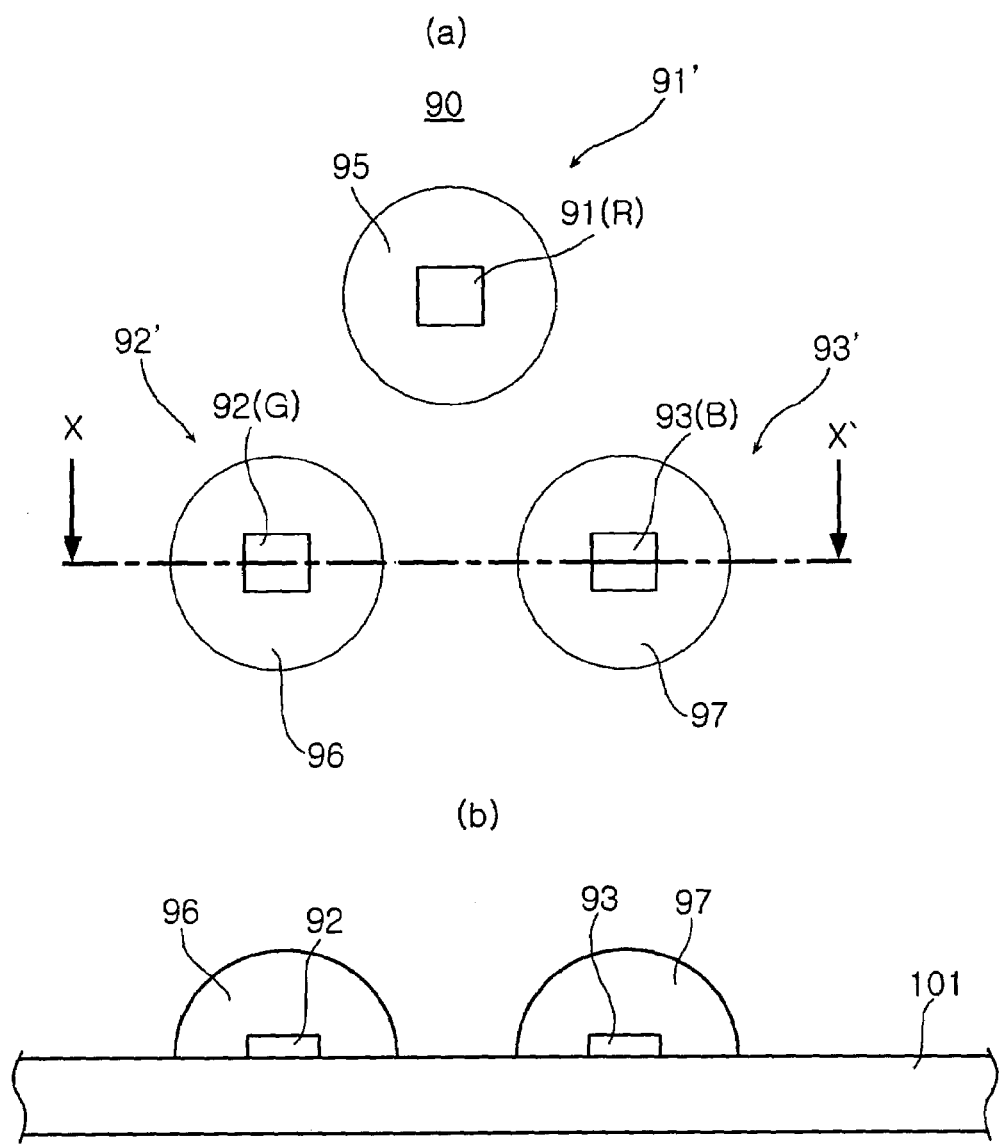
FIGS. 9 (a) and (b) are a plan view and a cross-sectional view illustrating further another example of LED clusters applicable to the invention.

The LEDs applicable to the surface light source device of the invention can be variously configured as e.g., a semiconductor chip or package. FIGS. 7 to 9 illustrate exemplary LED clusters applicable to the surface light source of the invention.

Referring to FIG. 7, an LED cluster 70 is configured as a package which has red R, green G and blue B LED chips mounted thereon. For example, the red LED 71, the green LED chip 72, and the blue LED chip 73 may be mounted in a triangular configuration on a reflective cup 76 of a package body 75.

In FIG. 8, each of red, green and blue LEDs within an LED cluster is configured as a package. Referring to FIG. 8, a red LED package 81', a green LED package 82' and a blue LED package 83' are arranged in a triangular configuration to form an LED cluster 80. The red LED package 81' includes a package body 85 and a red LED chip 81 mounted thereon. The green LED package 82' includes a package body 86 and a green LED chip 82. Likewise, the blue LED package 83' includes a package body 87 and a blue LED chip 83 mounted thereon.

In FIG. 9, each of blue, green and red LEDs has an LED chip mounted by a chip-on board technique. Referring to FIG. 9, the red LED 91' includes a red LED chip 91 directly mounted on a board 101 and a hemispherical resin encapsulant or a lens 95 surrounds the red LED chip 91. The green and blue LED 92' and 93' include LED chips 92 and 93 directly mounted on the board 101 and the hemispherical resin encapuslants 96 and 97 surrounding the LED chips 92 and 93, respectively. These red, green and blue LEDs 91', 92' and 93' mounted by the chip on board technique are arranged in a triangular configuration to form an LED cluster 90. The LEDs mounted by the chip-on board technique are beneficial for obtaining a great view angle.

Figure 10:
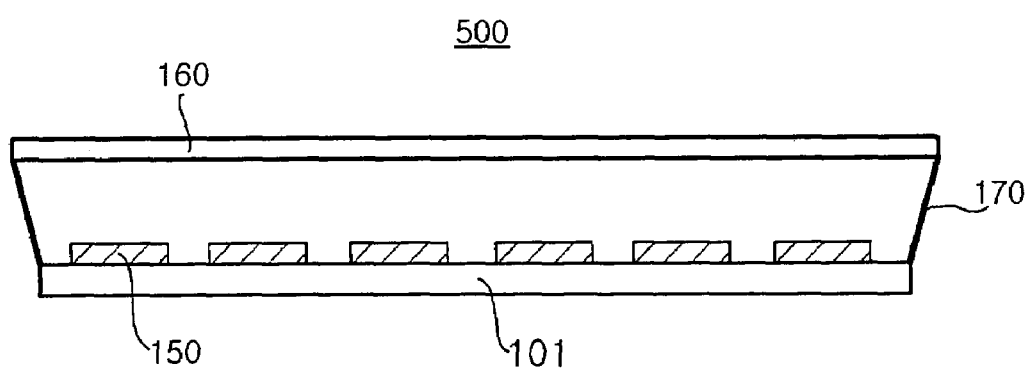
FIG. 10 is a schematic cross-sectional view illustrating a backlight unit according to an embodiment of the invention.

FIG. 10 is a schematic cross-sectional view illustrating a backlight unit employing a surface light source device as described above. Referring to FIG. 10, a backlight unit 500 includes a board 101 such as a PCB, a plurality of LED clusters 150 arranged on the board 101 and a diffusing plate 160 disposed above the LED clusters 150 at a predetermined distance from the board 101. An optical sheet such as a light gathering sheet or a prism sheet may be disposed over the diffusing plate 160. A reflective plate 170 is disposed at edges of the board to outwardly reflect light propagating laterally from the board.

Each of the LED clusters 150 has green, red and blue LEDs arranged in a triangular configuration as described above (refer to FIGS. 3, 5, 7 to 9). The LED clusters 150 are arranged on the board 101 in the same manner as described above with reference to FIGS. 4 and 6. For example, the LED clusters 150 may be arranged, as illustrated in FIG. 4, in a matrix including third cluster arrays 180 arranged repeatedly. Alternatively, the LED clusters may be arranged, as illustrated in FIG. 6, in a matrix including the third cluster arrays 180 arranged repeatedly, terminating with the alternating arrays of D-C and A-D arranged repeatedly from top to bottom of the matrix.

As described above, the BLU 150 of the invention emits white light uniformly across a top surface of the board or the BLU, eliminating a problem of color difference or color stains. Accordingly, the number of the LEDs required can be diminished to save manufacturing costs for the BLU.

As set forth above, according to exemplary embodiments of the invention, a surface light source device generates white light uniformly across a top surface of a board. Light from red, green and blue LEDs is optimally combined together at a central portion and side portions of the board to produce uniform white light across an overall area. This suppresses color stains at the side portions or corners of the board. This accordingly decreases the number of the LEDs required, thereby reducing manufacturing costs for the BLU.

While the present invention has been shown and described in connection with the preferred embodiments, it will be apparent to those skilled in the art that modifications and variations can be made without departing from the spirit and scope of the invention as defined by the appended claims.

What is claimed is:

1. A surface light source device comprising:
a board; and
a plurality of light emitting diode clusters arranged in a matrix of rows and columns on the board, each of the light emitting diode clusters including a red light emitting diode, a green light emitting diode and a blue light emitting diode arranged in a triangular configuration,
wherein the light emitting diode clusters are grouped into A, E, C and D clusters according to locations of the red light emitting diodes, the A, E, C and D clusters having the red light emitting diodes located top, right, bottom and left, respectively, from a center of the triangular configuration,
wherein the matrix of the light emitting diode clusters includes alternating first and second type rows arranged repeatedly from top to bottom of the matrix, terminating with a second type row,
wherein each of the first type rows has first type cluster arrays of the light emitting diode clusters arranged in a repeating order of E, C, D and C from left to right, terminating with D and C sequentially, and
wherein each of the second type rows has second type cluster arrays of the light emitting diode clusters arranged in a repeating order of A, D, A and D from left to right, terminating with A and D sequentially.

2. The surface light source device according to claim 1, wherein in the matrix of the first and second type cluster arrays, odd rows have only the first type cluster arrays arranged in a repeating order, and even rows have only the second type cluster arrays arranged in a repeating order.

3. The surface light source device according to claim 1, wherein the matrix of the light emitting diode clusters includes a plurality of third type cluster arrays arranged repeatedly across the board, each of the third type cluster arrays comprising a 2×4 matrix which has an upper row of the first type cluster arrays and a lower row of the second type cluster arrays.

4. The surface light source device according to claim 1, wherein in the matrix of the first and second type cluster arrays, odd rows have the first type cluster arrays arranged in a repeating order, terminating with D and C sequentially, and even rows have the second type cluster arrays arranged in a repeating order, terminating with A and D sequentially.

5. The surface light source device according to claim 1, wherein each of the light emitting diode clusters comprises a package including a package body mounted on the board and red, green and blue light emitting diode chips mounted on the package body.

6. The surface light source device according to claim 1, wherein each of the red, green and blue light emitting diodes comprises a package including a package body mounted on the board and a light emitting diode chip mounted on the package body.

7. The surface light source device according to claim 1, wherein each of the red, green and blue light emitting diodes comprises a light emitting diode chip directly mounted on the board and a resin encapsulant surrounding the light emitting diode chip.

8. A surface light source device comprising:
a board;
a plurality of light emitting diode clusters arranged in a matrix of rows and columns on the board, each of the light emitting diode clusters including a red light emitting diode, a green light emitting diode and a blue light emitting diode arranged in a triangular configuration; and a diffusing plate disposed over the light emitting diode clusters at a predetermined interval from the board, wherein the light emitting diode clusters are grouped into A, E, C and D according to locations of the red light emitting diodes, the A, E, C and D clusters having the red light emitting diodes located top, right, bottom and left, respectively, from a center of the triangular configuration, wherein the matrix of the light emitting diode clusters includes alternating first and second type rows arranged repeatedly from top to bottom of the matrix, terminating with a second type row, wherein each of the first type rows has first type cluster arrays of the light emitting diode clusters arranged in a repeating order of E, C, D and C from left to right, terminating with D and C sequentially, and wherein each of the second type rows has second type cluster arrays of the light emitting diode clusters arranged in a repeating order of A, D, A, and D from left to right, terminating with A and D sequentially.

9. The surface light source device according to claim 8, wherein in the matrix of the first and second type cluster arrays, odd rows have only the first type cluster arrays arranged in a repeating order, and even rows have the second type cluster arrays arranged in a repeating order.

10. The surface light source device according to claim 8, wherein the matrix of the light emitting diode clusters includes a plurality of third type cluster arrays arranged repeatedly across the board, each of the third type cluster arrays comprising a 2×4 matrix which has an upper row of the first type cluster arrays and a lower row of the second type cluster arrays.

11. The surface light source device according to claim 8, wherein in the matrix of the first and second type cluster arrays, odd rows have the first type cluster arrays arranged in a repeating order, terminating with D and C sequentially, and even rows have the second type cluster arrays arranged in a repeating order, terminating with A and D sequentially.

12. The surface light source device according to claim 8, wherein each of the light emitting diode clusters comprises a package including a package body mounted on the board and the red, green and blue light emitting diode chips mounted on the package body.

13. The surface light source device according to claim 8, wherein each of the red, green and blue light emitting diodes comprises a package including a package body mounted on the board and a light emitting diode chip mounted on the package body.

14. The surface light source device according to claim 8, wherein each of the red, green and blue light emitting diodes comprises a light emitting diode chip directly mounted on the board and a resin encapsulant surrounding the light emitting diode chip.

* * * * *